(12) United States Patent
Wäseby (10) Patent No.: US 8,915,676 B2
(45) Date of Patent: Dec. 23, 2014

(54) SUBSEA CLAMP CONNECTOR EMERGENCY RELEASE TOOL AND METHOD

(75) Inventor: Thomas Wäseby, Karlstad (SE)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 13/979,960

(22) PCT Filed: Feb. 9, 2012

(86) PCT No.: PCT/NO2012/000017
§ 371 (c)(1),
(2), (4) Date: Jul. 16, 2013

(87) PCT Pub. No.: WO2012/108775
PCT Pub. Date: Aug. 16, 2012

(65) Prior Publication Data
US 2013/0309032 A1    Nov. 21, 2013

(30) Foreign Application Priority Data

Feb. 10, 2011    (NO) .................................... 20110234

(51) Int. Cl.
*E21B 29/12*    (2006.01)
*B23D 57/00*    (2006.01)
*B27B 5/12*    (2006.01)

(52) U.S. Cl.
CPC ............ *E21B 29/12* (2013.01); *B23D 57/0084* (2013.01); *B27B 5/12* (2013.01)
USPC .......................................... 405/190; 405/158

(58) Field of Classification Search
USPC ........................ 405/158, 190, 1, 91
See application file for complete search history.

(56) References Cited

U.S. PATENT DOCUMENTS

| 3,007,355 | A | * | 11/1961 | Ver Nooy ........................ 408/67 |
| 4,557,628 | A | | 12/1985 | Cowan |
| 5,273,376 | A | | 12/1993 | Ritter, Jr. |
| 5,800,099 | A | * | 9/1998 | Cooper .......................... 408/1 R |
| 6,648,562 | B1 | * | 11/2003 | Calkins et al. .................. 408/67 |
| 7,435,041 | B1 | * | 10/2008 | McGill ........................... 408/92 |

(Continued)

FOREIGN PATENT DOCUMENTS

WO    WO-2006126884 A1    11/2006

OTHER PUBLICATIONS

Bäcknert, Christer, "International Search Report" for PCT/NO2012/000017, as mailed May 10, 2012, 5 pages.

*Primary Examiner* — John Kreck
(74) *Attorney, Agent, or Firm* — Winstead PC (57) ABSTRACT

A clamp connector emergency release tool designed for subsea operations, when normal release of a subsea clamp connector (14) is not possible, is shown and described. The tool is adapted to be handled and operated remotely by a work class ROV tool. The tool includes a clamp connector (14) adapter housing (7) arranged to engage with and connect to the clamp connector (14) body, a rotatable hole saw (11) mounted on the housing (7), a rotary motor (1) in driving connection with the hole saw (11) and a piston (3) and cylinder assembly (4,5). The piston (3) and cylinder assembly (4,5) enables advancing the rotatable hole saw (11) into the clamp connector (14) body around its jack screw, in order to separate the jack screw together with a threaded portion of said clam connector (14) in order to separate the jack screw from the clamp connector (14) body.

10 Claims, 8 Drawing Sheets

(56) References Cited

U.S. PATENT DOCUMENTS

| | | | |
|---|---|---|---|
| 7,441,993 B2 * | 10/2008 | Evans | 408/1 R |
| 8,360,156 B1 * | 1/2013 | Blanchard et al. | 166/369 |
| 8,539,846 B2 * | 9/2013 | Crumpton | 73/863.85 |
| 2002/0106247 A1 | 8/2002 | Russell | |
| 2005/0145389 A1 | 7/2005 | Barrow et al. | |
| 2008/0304915 A1 | 12/2008 | Bang | |

* cited by examiner

SUBSEA CLAMP CONNECTOR EMERGENCY RELEASE TOOL AND METHOD

The present invention relates in general to an emergency release tool for a connector designed for sub sea operation, and to a method for emergency release of such clamp connector, applying the tool.

More specifically, the present invention relates to an emergency release tool for a clamp connector adapted for sub sea operation, which tool is applied, when release of a subsea connector by normal mechanism is not possible.

More particularly, the present invention relates to an emergency release tool according to the preamble of claim 1 and to a method for releasing a subsea clamp connector, according to the preamble of claim 9.

The clamp connector emergency release tool is adapted to be handled and operated remotely by a work class ROV tool.

TECHNICAL BACKGROUND OF THE INVENTION

In onshore and offshore operations such as for hydrocarbon exploration and production, application of subsea clamp connectors is very common. These connectors are applied for attachment of various subsea assemblies. Examples may be marine risers, production flow lines attached to well heads and so on.

It is also common knowledge that subsea assemblies need to be removed after the desired operation is over, or if there is some problem with the line. For that purpose, the clamp connectors securing the line need to be unlocked/released in a subsea environment. This has to be done remotely with the assistance of a ROV carrying a ROV tool.

After operation for a substantial period of time, the clamp connector may get jammed up and normal release of the connector is not possible by applying conventional torque tool. In such a case, an emergency release tool needs to be applied, which should be possible by subsea operation of the ROV.

Over the years, there has been a requirement for such emergency release tool, for release of clamp connectors, which is capable of sub sea operation when remotely applied, such that the connector is released in a safeguarded manner, ensuring proper detachment of the concerned subsea assemblies. However, significant achievement in this respect is yet to be achieved.

The present invention relates to a clamp connector emergency release tool designed for subsea operations when normal release of a clamp connector is not possible, which tool is handled and operated by a work class ROV tool able to cut around the jack screw of a clamp connector in order to open up the clamp connector.

Granted U.S. Pat. No. 5,273,376 teaches an emergency release tool for forcefully removing a marine assembly from a subsea assembly. The marine assembly has a first flange and the sub sea assembly has a second flange. The tool has a U-shaped frame which is transported and positioned between the flanges by ROV. Hydraulic means is mounted on the frame. This hydraulic means exerts pressure on the flanges when it is actuated by a hydraulic fluid. The hydraulic fluid is supplied from means located on ROV. On doing so, the hydraulic means generates a force normal to the frame and pushes the flanges apart.

From the paragraph above, it should be understood that this US patent leaves scopes of malfunctioning of the complicated arrangement and the methodology applied, which involves forcefully prying and breaking the clamps open. This requires a much larger force to be generated than cutting through the clamp. Hence, achieving the emergency release in a safeguarded manner, enabling ensured and clear release is not achieved.

US 2005145389A1 discloses a subsea well casing cutting tool comprising a casing gripper and a rotary cutter drive assembly. This merely discloses an arrangement for straightaway cutting a subsea well casing and removing it, for example, when it is abandoned. It is not directly related to sub sea emergency release of a clamp connector used for locking sub sea assemblies.

Similar comments as above are applicable in respect of granted U.S. Pat. No. 4,557,628, which discloses an apparatus and method for remotely cutting broken parts of an underwater upright structure for emergency removal of such broken parts. Hence, this also is not directly related to sub sea emergency release of a clamp connector, used for locking sub sea assemblies.

Similarly, US 2008/0304915A1 discloses a method and device for attaching a cutting assembly to a sea bed, the cutting assembly comprising a frame work for holding the object to be cut and a cutter head.

All the above prior art relate to sub sea operation and involve cutting operation including a cutter drive. None of these have the teaching of the present invention as described herein and claimed in the appended claims.

OBJECTS OF THE INVENTION

It is the principal object of the present invention to provide an emergency release tool, capable of releasing a jammed up clamp connector and suitable for sub sea operation by means of a work class ROV, such that the connector is released in a safeguarded manner, enabling clear and emergency release of the clamped sub sea assemblies.

It is a further object of the present invention to provide an emergency release tool for use on a clamp connector suitable for sub sea operation by means of a work class ROV, which works when conventional techniques applying a torque tool fails.

It is yet another object of the present invention to provide an emergency release tool for use on a clamp connector which is adapted to be applied in emergency situations to release a "Horizontal Connection Module" (HCM) from a "Clamp Connector" (CC), if the usual method of applying the conventional torque tool fails.

It is a further object of the present invention to provide an emergency release tool for use on a clamp connector, suitable for sub sea operation by means of a work class ROV which is simple in use and construction, and does not involve complicated operating steps or components.

It is another object of the present invention to provide a method for releasing a sub sea clamp connector by applying an emergency release tool with the help of a work class ROV, such that the connector is released in a sacrosanct manner, enabling clear and emergency release of the clamped sub sea assemblies.

How the foregoing objects are achieved and some other advantageous features, still not disclosed in prior art, will be clear from the following non-limiting description.

All through the specification including the claims, the words, "connector", "clamp connector", "hydraulic fluid", "work class ROV", "piston", "cylinder assembly", "hole saw", "hydraulic cylinder", "jack screw" are to be interpreted in the broadest sense of the respective terms and includes all similar items in the field known by other terms, as may be clear to persons skilled in the art. Restriction/limitation, if any, referred to in the specification, is solely by way of example and understanding of the present invention.

SUMMARY OF THE INVENTION

Accordingly, the present invention provides a clamp connector emergency release tool designed for subsea operations, when normal release of a subsea clamp connector is not possible. This tool is handled and operated remotely by a work class ROV tool. The tool according to the invention, includes a clamp connector adapter housing arranged to engage with and connect to the clamp connector body, a rotatable hole saw mounted on the adapter housing, a rotary motor in driving connection with the rotatable hole saw and a piston and cylinder assembly arranged to advance the rotatable hole saw into the clamp connector body while cutting around a jack screw of the clamp connector, in order to separate the jack screw together with a threaded portion of the clamp connector body from the remainder of the clamp connector body, for its perfect releasing.

Preferably, the rotary motor is hydraulically operated and driven and the piston and cylinder assembly are hydraulically actuated.

Preferably, the tool also includes an upper pack box and lower pack box for having hydraulic fluid sealing arrangement.

In one preferred embodiment, the tool includes an indicator for indicating the engage position and disengage position of the hole saw, with respect to the clamp connector body.

Moreover, the tool may include a ROV handle arranged on the hydraulic piston cylinder.

Preferably, the tool includes guiding means arranged on the clamp connector adapter housing for facilitating its landing on the clamp connector body.

More preferably, the tool includes a landing indicator for indicating correct landing of the housing on the clamp connector body.

In one embodiment the clamp connector is of the kind having two hinges and three links.

The present invention also provides a method of emergency release of a subsea located clamp connector by use of a connector emergency release tool, when normal release of a clamp connector is not possible, which tool is handled and operated by a work class ROV tool. The method comprises operating the tool and advancing it into the clamp connector body by cutting the clamp connector body adjacent to its jack screw. This ensures cutting loose the jack screw together with a thread portion of the clamp connector body for separating the jack screw from the clamp connector body. Hence, perfect release of the subsea clamp connector is ensured.

Preferably, the cutting operation as described in the preceding paragraph, takes place by use of a hole saw driven by a rotary motor and advanced by means of a hydraulic piston and cylinder.

BRIEF DESCRIPTION OF THE ACCOMPANYING FIGURES

Having described the main features of the invention above, a more detailed and non-limiting description of a preferred embodiment is given in the following with reference to the drawings, in which.

DETAILED DESCRIPTION OF THE INVENTION

The following provides a detailed non-limiting description of a preferred embodiment of the present invention which is purely exemplary.

The present invention discloses a clamp connector emergency release tool designed for subsea operations when normal release of a clamp connector is not possible. This tool is handled and operated by a work class ROV tool such that the clamp connector is released by cutting the body of the clamp connector, around the jack screw, for opening up the clamp connector.

The emergency release tool has a simple construction and can be applied by the ROV in subsea condition, for cutting around the jack screw as explained in the preceding paragraph. Here lies the uniqueness of the emergency release tool of the present invention which achieves releasing of a clamp connector, in a subsea environment in a sacrosanct manner, such that the clamped assemblies may be removed.

The present invention also relates to a method of releasing a subsea located clamp connector by applying the connector emergency release tool when normal release of a clamp connector is not possible. This may happen after prolonged sub sea operation, when the clamp connector gets jammed up.

Thus, the emergency release tool according to the present invention can be effectively applied in emergency situations to release a "Horizontal Connection Module" (HCM) from a "Clamp Connector" if the usual method, using the conventional "Torque Tool", fails.

The unique constructional features of the emergency release tool and the method of its working is explained later, in detail with reference to the accompanying drawings. It is known and as stated under the heading "Technical Background of the Invention", sub sea clamp connectors are applied for attaching sub sea assemblies.

A clamp connector 14 (best shown in FIG. 2a) of this kind has three arc shaped links 14' hingedly connected to each other. Each link 14' is made up by a pair arc shaped link pieces placed in parallel a distance apart from each other and connected by pivot pins providing the hingedly connection between the respective links 14'. Such clamp connectors, when activated, forces two pipe flanges axially towards each other. The activation takes place by turning a jack screw by use of a conventional torque tool.

The jack screw 15 (best shown in FIG. 4*a*) is simply a heavy gauge bolt with external threads through most of its entire extension and terminates in a square or hexagon bolt head, normally not wider than the bolt shaft. As stated above, such clamp connectors 14 are generally of a two hinged 14" construction, with three links 14' and can be opened up to be withdrawn from a pipe joint, or closed to be tightened around the pipe joint. The connector 14 is able to retain a metal-to-metal seal intended to be located between the pipe flanges.

The jack screw 15 passes through a centrally located seal plate and transversally extending blocks arranged on respective clamp connector link ends, with the blocks facing each other when the clamp connector is closing. One of the blocks has internal left hand threads, while the other is provided with internal right hand threads, which engage with corresponding threads on the jack screw 15. The jack screw 15 is rotatable in the seal plate, but still retained by the plate. This is the location where the right hand and left hand threads of the jack screw 15 meet. Thus, by turning the jack screw 15 in one direction the blocks are drawn towards each other in order to tighten the clamp connector 14. By turning the jack screw 15 in the other direction, the clamp connector 14 is opened up and released. The configuration of the clamp connector 14 is not shown in closer detail, since this design is not part of the present invention and is per se known to persons skilled in the art.

Figure 1A:
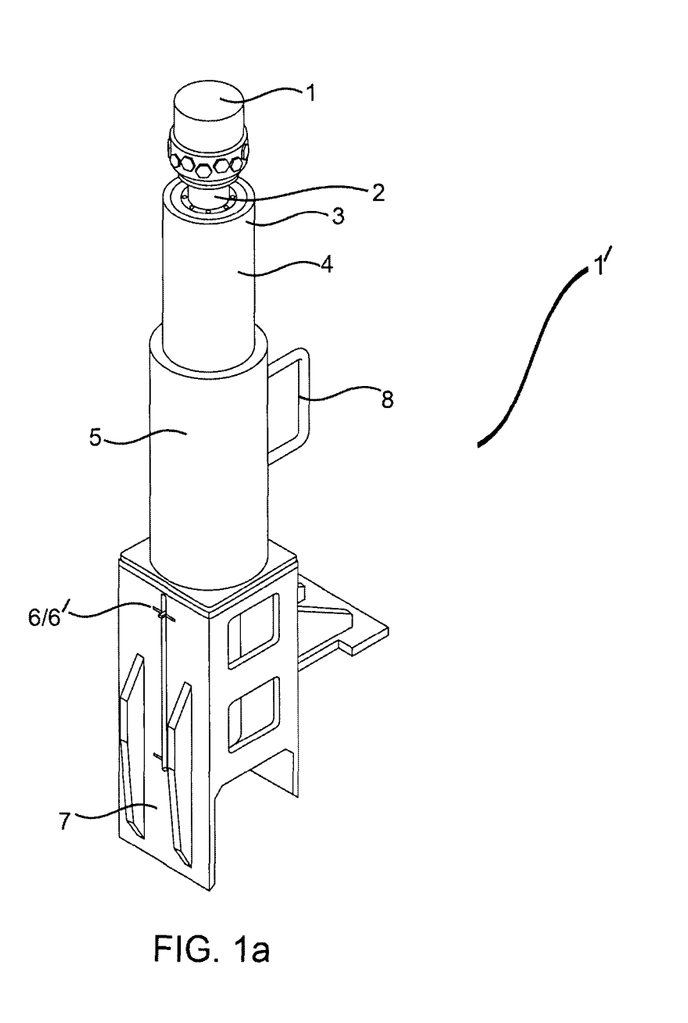
FIG. 1a and 1b illustrate an isometric view and a sectional view respectively, of the emergency release tool according to the present invention.
Figure 1B:
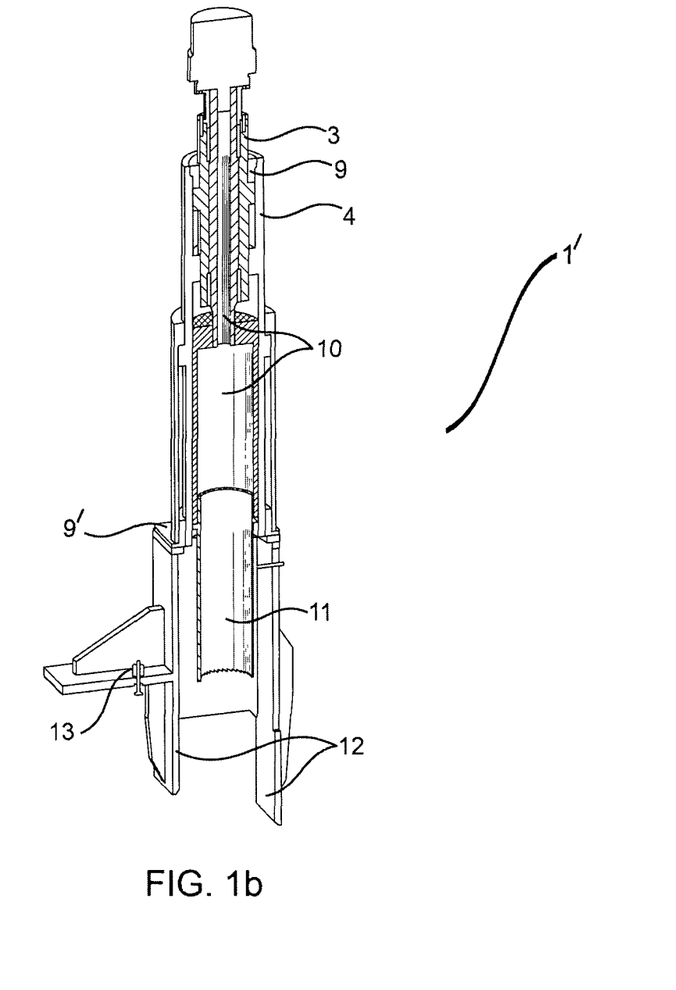

The emergency release tool 1' is illustrated in FIGS. 1*a* and 1*b*. As shown in FIG. 1*a*, the tool 1' has a hydraulic cylinder comprising of a lower cylindrical housing 5, encasing another housing 4 of a hydraulic piston 3 (best shown in the cross-sectional view 1*b*). A ROV handle 8 is installed on the cylindrical housing 5 for operating by a ROV (not shown). The tool 1' also has a clamp connector adapter housing 7 at its lower end. This housing 7 is adapted to land on a clamp connector body 14 (best shown in FIGS. 2*a*, 4*a*, 5*a*) and engage therewith. The housing 7 is also provided with disengage/engage position indicator 6/6', the functions of which are explained later.

As shown in FIG. 1*b*, a rotation rod 10 is operatively connected to a hydraulic rotary motor 1. FIG. 1*a* also shows the motor bracket 2. A hole saw 11 is connected to the rotation rod 10, which in turn is forced down by the hydraulic piston 3 during operation. The rod 10 is rotatable by the motor 1, so that the rod 10 acts as the rotatable drive of the hole saw 11.

The FIG. 1*b* also shows an upper pack box 9 and a lower pack box 9' which provides a hydraulic fluid sealing arrangement, for preventing leakage under pressure thereof On the wall opposite to the disengage/engage indicator 6/6', the clamp connector adapter housing 7 is provided with a landing indicator 13, which indicates proper landing of the housing 7 on the clamp connector body 14. The guide plates 12 enhance this landing process with precision.

How the various features function is now explained with reference to the FIGS. 2*a*, 2*b*, 3, 4*a*, 4*b*, 5, 6*a*, 6*b*, 7*a* and 7*b* where like reference numerals represent like constructional features as detailed hereinbefore.

The operation starts with the landing of the emergency tool on the clamp connector body 14. This is effected by ROV (not shown). Incidentally, the ROV secures the emergency release tool 1' in position during the operation and also effects the operation as now explained in detail.

Figures 2A, 2B:
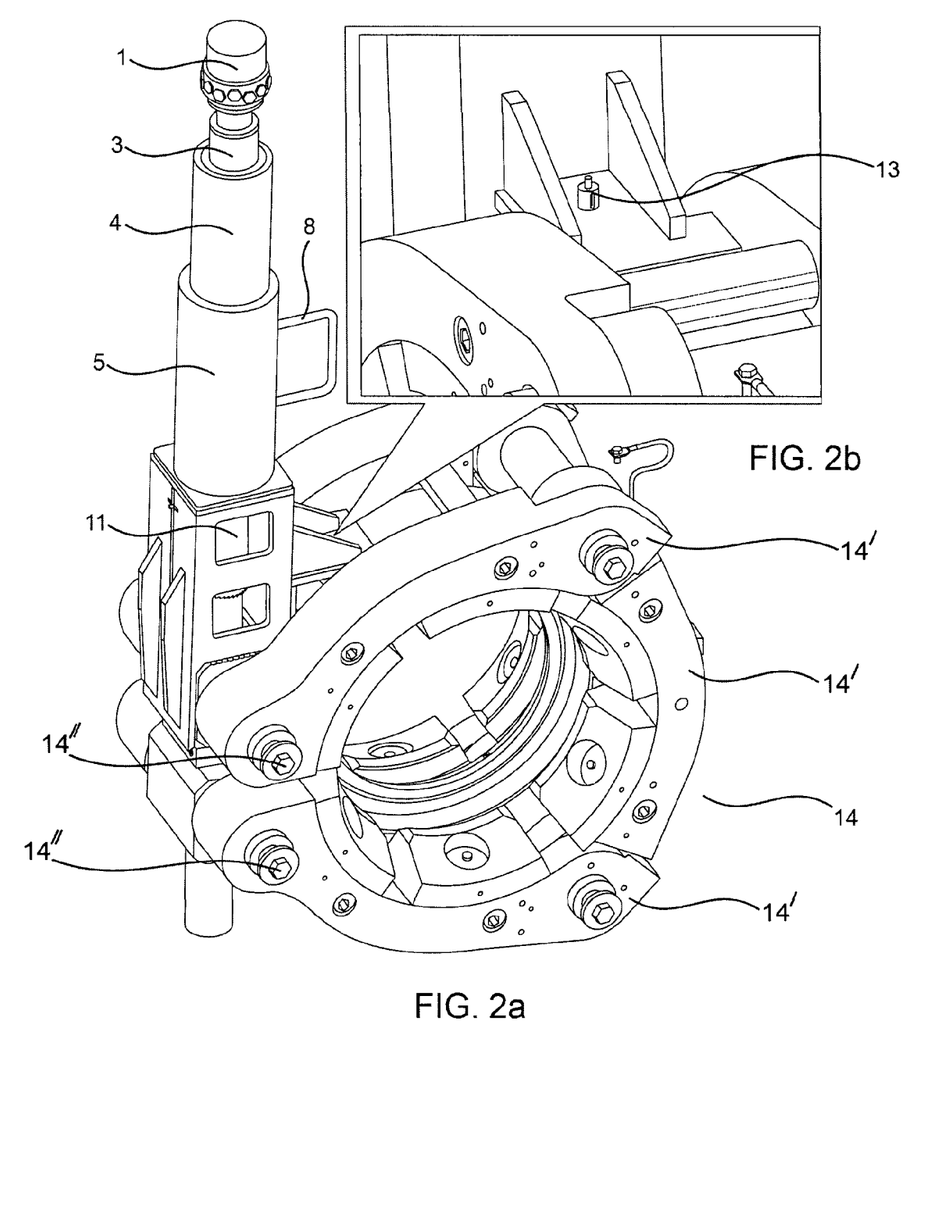
FIG. 2a illustrates the emergency release tool according to the present invention, mounted on a clamp connector.
FIG. 2b illustrates an enlarged view of a portion shown in FIG. 2a to clearly show the landing indicator.
Figure 3:
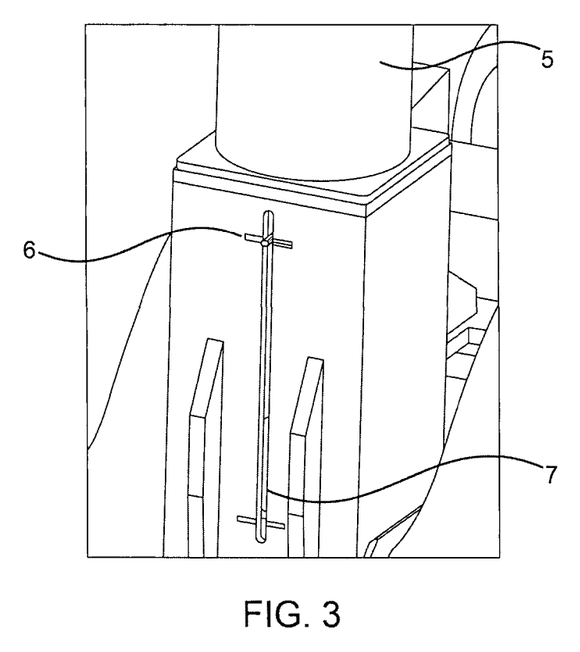
FIG. 3 illustrates in more detail the position indicator of the emergency release tool according to the present invention.

FIG. 2*a* shows this position where the emergency release tool 1' has landed on the clamp connector body 14. The landing indicator 13 shown in FIG. 2*b*, gives the indication for correct landing of the tool 1' on the clamp connector body 14 by the ROV (not shown). The landing position in FIG. 2*a*, is shown in detail in FIG. 2*b*.

Figures 4A, 4B:
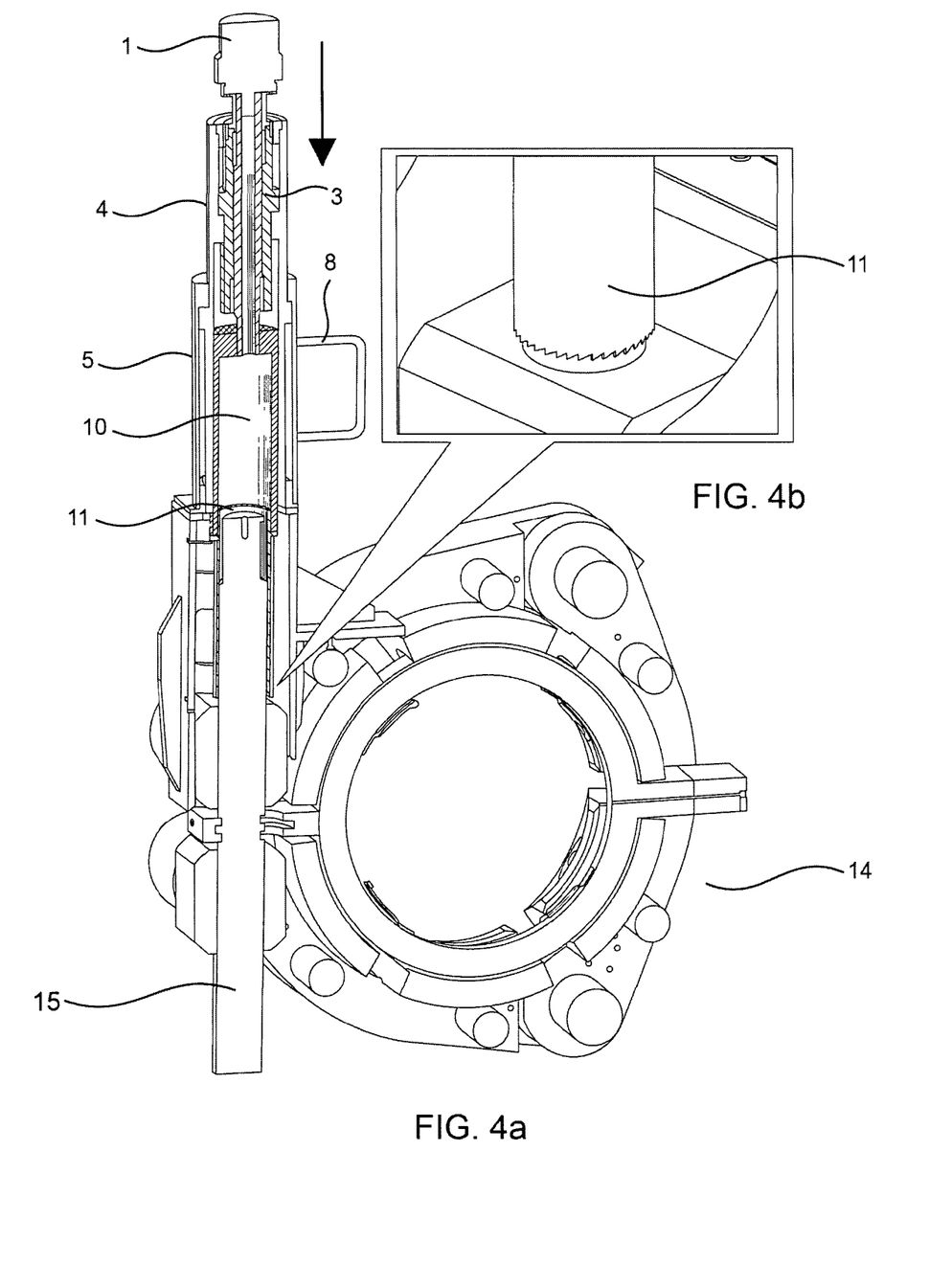
FIG. 4a illustrates a longitudinal cross section through the emergency release tool and the clamp connector according to the present invention.
FIG. 4b illustrates an enlarged view of a portion shown in FIG. 4a to clearly show the position of the hole saw on the clamp connector body.

The next step involves activating the piston 3 inside the cylinder 4 by actuating hydraulic means (not shown) so that the hole saw 11 is positioned co-axially to and around the jack screw 15 on the connector body 14. The FIG. 3 in detail shows the indictor position 6 at this stage, which indicator helps in monitoring and effecting the operation. The FIG. 4*a* illustrates this position of the hole saw 11 of the emergency release tool, around the jack screw 15. The FIG. 4*b* illustrates an enlarged portion of FIG. 4*a* to precisely show this position.

The position as detailed in the preceding paragraph is the precutting position.

Figures 5A, 5B:
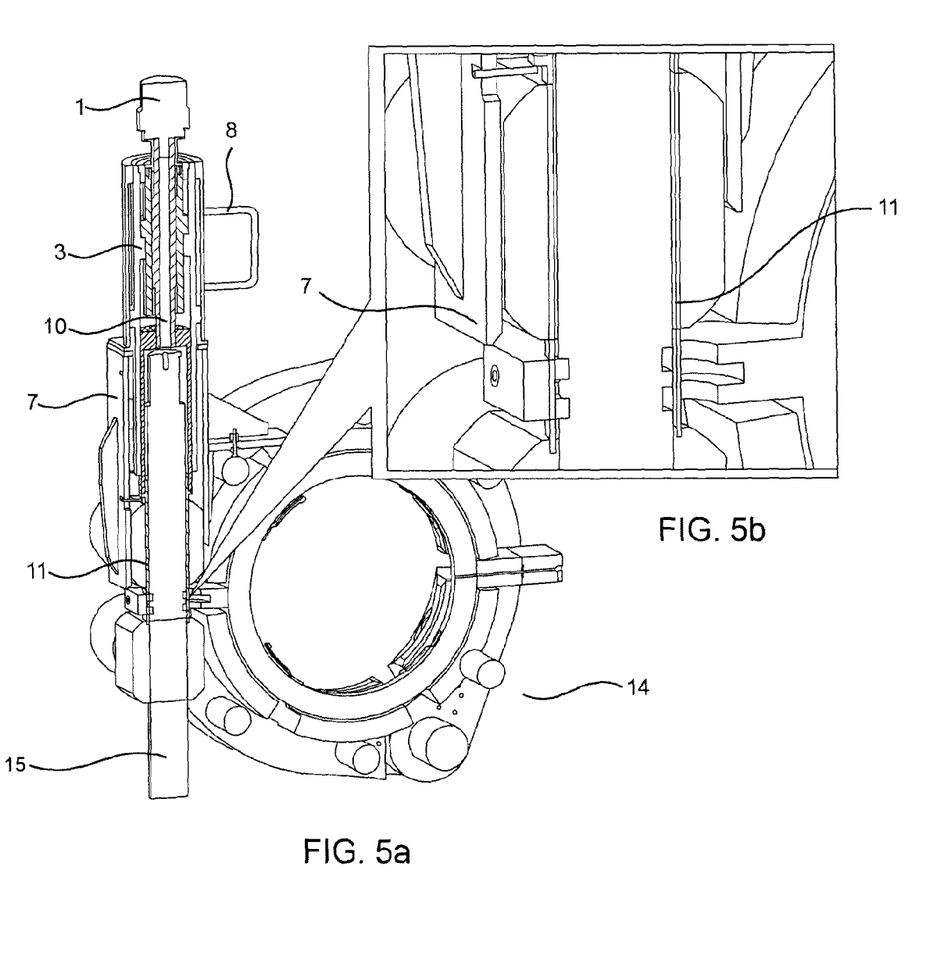
FIG. 5a illustrates a stage when the emergency release tool illustrated in FIG. 4a has advanced into the body of the clamp connector.
FIG. 5b illustrates an enlarged view of the portion of FIG. 5a, that shows the stage where the hole saw has already cut through the main clamping portion.

Now the hydraulic motor 1 is started and the drive of the hole saw 11, i.e. rotation rod 10 starts rotating the hole saw 11. The cylinder 5 is actuated hydraulically by release of hydraulic fluid in the cylinder 5, so that the cylinder 4 with the piston rod 3 comes further down. This ensures that the hole saw 11 starts cutting down into the upper transversal block of the clamp connector 14 around the jack screw 15 and performs penetration. FIG. 5*a* shows this stage.

It can be seen from FIG. 5*a* that the hole saw 11 has penetrated and been cutting through the clamp connector body 14 around the jack screw 15, and also into and through the seal plate. The enlarged view in FIG. 5*b* further clarifies this.

Figure 6:
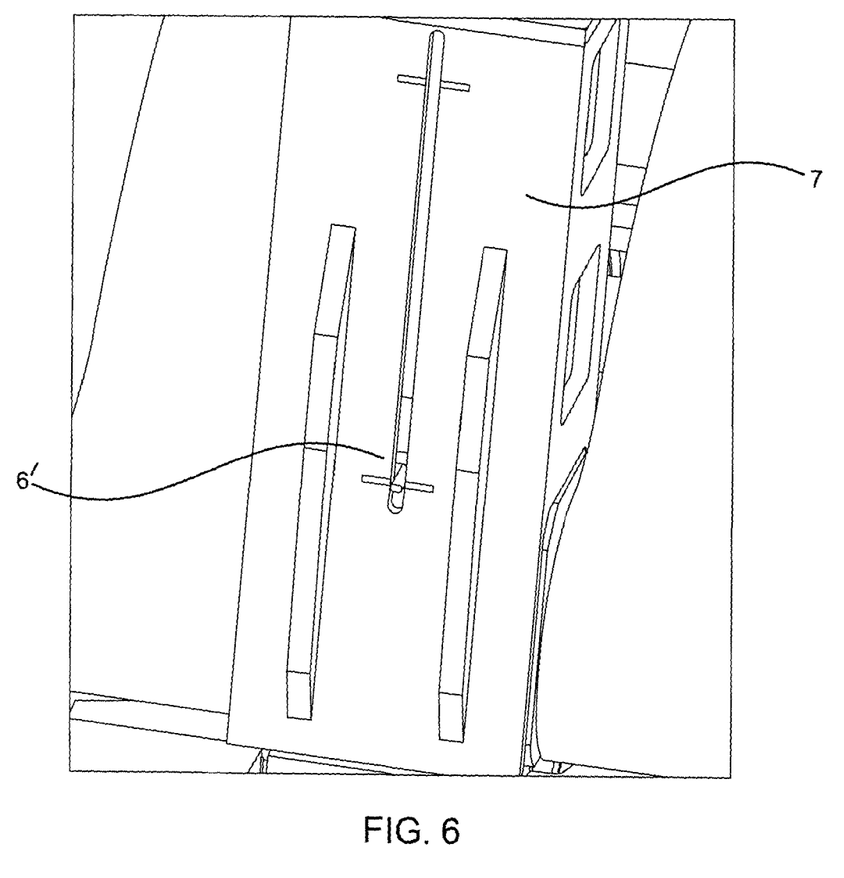
FIG. 6 illustrates in more detail the position indicator of the emergency release tool according to the present invention, in engaged position.

The FIG. 6 shows the position 6', as indicated by the indicator where the cutting operation is finished. This again facilitates perfect monitoring of the operation, to take a decision where the operation should end. At this stage (not shown in closer detail), the hole saw 11 has, as mentioned, penetrated the clamp connector body 14 and the seal plate, and around the jack screw 15. By making the piston and cylinder 4, 5 longer, it would be possible to penetrate into the lower block of the clamp connector body 14 around the jack screw 15, actually all the way through if required.

Now, the clamp connector 14 is totally released since the hole saw has cut the body around the jack screw 15 together with a thread portion of the block(s) of the clamp connector 14.

From this position, disengagement of the hole saw 11 is started. The hydraulic cylinders 4, 5 are pressurized in the opposite direction to pull up the hole saw 11 and the indicator starts to move to disengaged position 6, as shown in detail in FIG. 7*b*. The operation now is just reverse of the one described above.

When the indicator is at position 6, the motor drive 1 is stopped and the emergency release tool is ready for upward removal from the clamp connector body 14. Of course, the motor may be stopped immediately after the cutting operation is over, i.e. before the pulling up operation of the hole saw 11.

The gas compensator camera (not shown) helps avoiding large pressure inside the tool body, during operation. Emergency pressure release valve (not shown) may be deployed for this purpose as well.

Figures 7A, 7B:
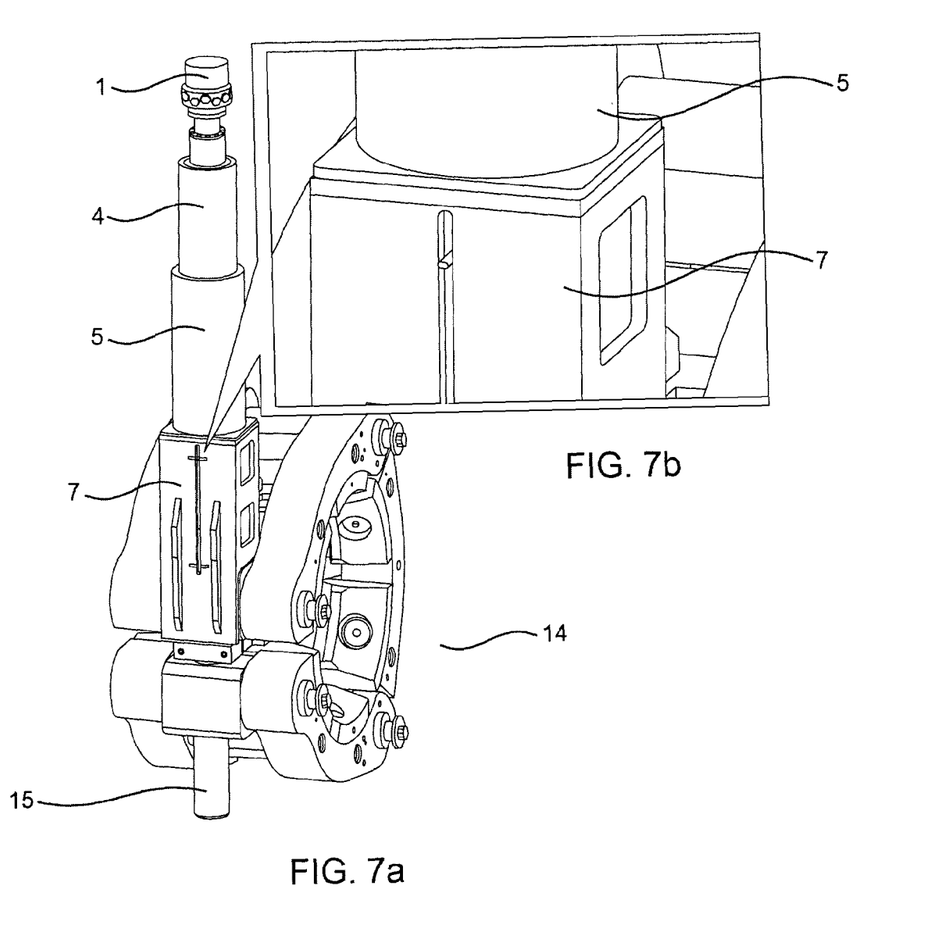
FIG. 7a illustrates the emergency release tool mounted on the clamp connector as in FIG. 2a when seen from the front.
FIG. 7b illustrates an enlarged view of a portion shown in FIG. 7a to clearly show the position indicator in disengaged position.

FIG. 7*a* is a front view of the tool, side view whereof is shown in FIG. 2*a*. This is again in the ideally disengaged position, as in FIG. 2*a*. This is shown in closer detail in FIG. 7*b*, as stated before, which is an enlarged view of the front portion of the clamp connector adapter housing 7. This is the position shown as 6 by the position indicator.

At this stage shown in FIG. 7*a*, the tool may be removed from the top of the clamp connector body 14 by an ROV utilizing the handle 8 on the cylinder 5. Once the emergency release tool 1' is removed, the clamp connector 14 is disengaged since the jack screw 15 and the thread portion of the clamp connector 14 has become loose from the remainder of the clamp connector 14. Due to the weight and hinged construction of the links 14', the lower transversal block of the lower link 14' will pull the jack screw 15 down from and through the upper block.

Thus, emergency release of a sub sea clamp connector is facilitated by the tool of the present invention which is operable by an ROV.

The emergency clamp connector release tool of the present invention and the method of applying it, as discussed hereinbefore is thus unique, hitherto unknown.

From the foregoing description and also from the appended claims it would be clear to persons skilled in the art, that all the objectives of the present invention are achieved.

The present invention has been described with reference to a preferred embodiment and drawings for the sake of understanding only and it should be clear to persons skilled in the art, that the present invention includes all legitimate modifications within the ambit of what has been described hereinbefore and claimed in the appended claims.

The invention claimed is:

1. A clamp connector emergency release tool designed for subsea operations, when normal release of a subsea clamp connector is not possible, the emergency release tool being adapted to be handled and operated remotely by a work class ROV tool, the clamp connector emergency release tool comprising:
   a clamp connector adapter housing arranged to engage with and connect to a clamp connector body;
   a rotatable hole saw mounted on the clamp connector adapter housing;
   a rotary motor in driving connection with the rotatable hole saw; and
   a piston and a cylinder arranged to advance the rotatable hole saw into the clamp connector body
   wherein, the rotatable hole saw cuts around a jack screw of the subsea clamp connector body, to separate the jack screw and a threaded portion of the clamp connector body from a remainder of the clamp connector body.

2. The clamp connector emergency release tool according to claim 1, wherein the rotary motor is hydraulically operated and driven and the piston and the cylinder assembly are hydraulically actuated.

3. The clamp connector emergency release tool according to claim 1, comprising an upper pack box and a lower pack box for having a hydraulic fluid sealing arrangement.

4. The clamp connector emergency release tool according to claim 1, comprising an indicator for indicating an engage position and a disengage position of the hole saw, with respect to the clamp connector body.

5. The clamp connector emergency release tool according to claim 1, comprising a ROV handle arranged on the cylinder.

6. The clamp connector emergency release tool according to claim 1, comprising guiding means arranged on the clamp connector housing for facilitating landing of the clamp connector housing on the clamp connector body.

7. The clamp connector emergency release tool according to claim 6, comprising a landing indicator for indicating correct landing of the clamp connector housing on the clamp connector body.

8. The clamp connector emergency release tool according to claim 1, wherein the clamp connector is of the kind having two hinges and three links.

9. A method of emergency release of a subsea located clamp connector by use of a connector emergency release tool, when normal release of a clamp connector is not possible, which tool is handled and operated by a work class ROV tool, the method comprising:
   operating the work class ROV tool;
   advancing the work class ROV tool into a clamp connector body by cutting the clamp connector body adjacent to a jack screw of the clamp connector body,
   cutting loose the jack screw together with a thread portion of the clamp connector body for separating the jack screw therefrom, thus ensuring perfect release of the subsea clamp connector.

10. The method according to claim 9, wherein the cutting takes place by use of a hole saw driven by a rotary motor and advanced by means of a hydraulic piston and a cylinder.

* * * * *